May 6, 1941.  F. MONTIGLIO  2,240,998
BICYCLE GEAR
Filed Nov. 13, 1939
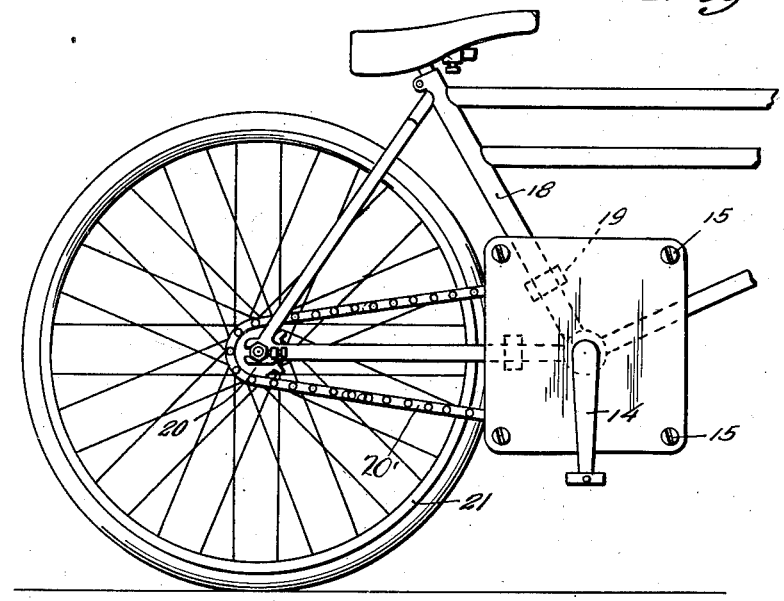
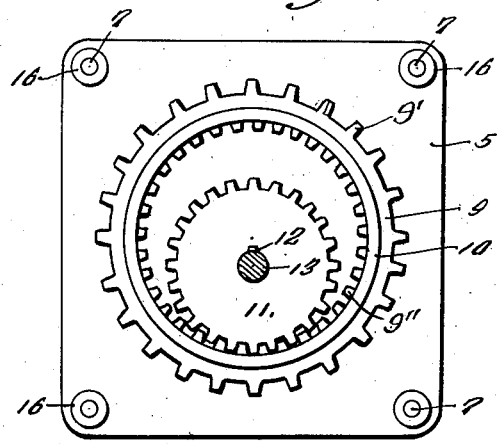
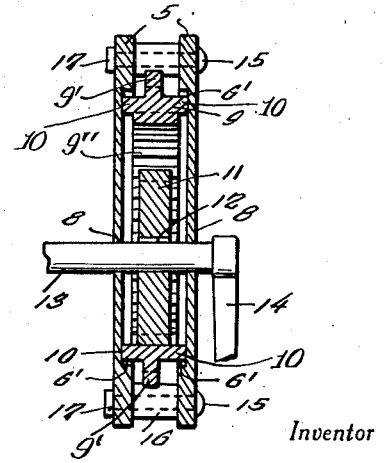
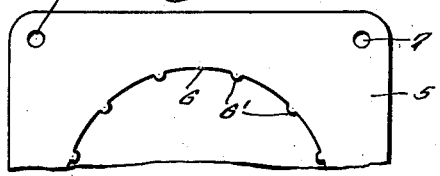
Inventor
Frank Montiglio
By Clarence A. O'Brien
and Hyman Berman
Attorneys Patented May 6, 1941

2,240,998

UNITED STATES PATENT OFFICE 2,240,998

BICYCLE GEAR

Frank Montiglio, Milwaukee, Wis.

Application November 13, 1939, Serial No. 304,224

3 Claims. (Cl. 74—413)

The present invention relates to bicycles, and more particularly to drive gearings therefor.

An object of the invention is to provide a drive gearing for a bicycle or the like wherein a rider may propel the same with a minimum of effort.

Other objects of the invention are to provide a drive gear of the aforementioned character, which will be comparatively simple in construction, light in weight, efficient in use and which may be manufactured at low cost.

Other objects and advantages of the invention will become apparent from a study of the following description taken in connection with the accompanying drawing, wherein like characters of reference designate like parts throughout the several views, and wherein:

Figure 1 is a fragmentary side elevational view of a bicycle with my invention attached thereto.

Figure 2 is a side elevational view of the invention shown with one side plate removed.

Figure 3 is a vertical transverse sectional view of the invention, and

Figure 4 is a fragmentary side elevational view of one of the plates.

Referring now to the drawing in detail, it will be seen that the reference numeral 5 designates a pair of substantially square flat plates constructed of suitable metallic material.

Each plate 5 has formed on one face thereof a recess 6 the peripheral wall of which is provided with projections 6', as shown in Fig. 3 of the drawing. Openings 7 and 8 are formed in the plates 5 the purpose of which will be presently set forth.

An internally and externally gear toothed sprocket gear 9 provided with teeth 9' and 9" and having annular flanges 10, 10 formed thereon is mounted between the assembled plates 5 and houses a gear 11 which is keyed as at 12 to a shaft 13 which is journaled in the openings 8. The shaft 13 and gears 9 and 11 are turned by a crank 14 secured to the shaft 13.

The various parts are held assembled by bolts 15 passing through the holes 7 and spacer sleeves 16 and secured by nuts 17.

The assembled device is secured to the frame 18 of the bicycle by brackets or other means as shown at 19 in Fig. 1 of the drawing with the conventional drive chain 20' passing over the external teeth of the internally toothed sprocket gear 9 and the sprocket 20 of the back wheel 21.

As can be seen when riding a bicycle equipped with the present invention the force exerted on the crank 14 is reduced as compared with conventional bicycle gearing now in use in that the gear 11 turning in the internally toothed sprocket 9 is of smaller diameter thus reducing the number of revolutions of the sprocket 9 as compared to the gear 11.

The projections 6' are provided to reduce to a minimum the surface contact between the flanges 10, 10 of the sprocket gear 9 in the recesses 6 to obviate friction as much as possible.

Although I have shown and described herein a preferred embodiment of my invention, it is to be definitely understood that I do not desire to limit the application of the invention thereto, and any change or changes may be made in the materials and in the structure and arrangement of parts, within the spirit of the invention as claimed.

What is claimed is:

1. In a device of the character described, a bicycle gear including an internally and externally toothed sprocket gear having annular flanges thereon, a pair of plates each having a recess therein and mounted on a bicycle frame in spaced relation to each other with each recess having one of said annular flanges engaged therein for supporting said internally and externally toothed sprocket gear, and means mounted between said spaced plates and engaged with said internal teeth on said toothed sprocket for operating the same.

2. In a device of the character described, a bicycle gear including an internally and externally toothed sprocket gear having annular flanges thereon and plates having recesses therein for supporting said sprocket gear with the annular flanges engaged in the recesses, and projections on the peripheral walls of the recesses for engaging the flanges on the toothed sprocket gear.

3. In a device of the character described, a bicycle gear including an internally and externally toothed sprocket gear having annular flanges thereon, a pair of plates each having a recess therein and mounted on a bicycle frame in spaced relation to each other with each recess having one of said annular flanges engaged therein for supporting said internally and externally toothed sprocket gear, a gear mounted between said spaced plates and engaged with said internal teeth on said toothed sprocket for operating the same, and a crank for operating said gear.

FRANK MONTIGLIO.